(12) United States Patent
Suzuki et al.

(10) Patent No.: US 7,900,728 B2
(45) Date of Patent: Mar. 8, 2011

(54) VEHICLE

(75) Inventors: Naoto Suzuki, Fujinomiya (JP); Shinji Ichikawa, Toyota (JP); Wanleng Ang, Okazaki (JP); Kenji Murasato, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 162 days.

(21) Appl. No.: 12/453,475

(22) Filed: May 12, 2009

(65) Prior Publication Data

US 2009/0315359 A1   Dec. 24, 2009

(30) Foreign Application Priority Data

Jun. 20, 2008   (JP) .................................. 2008-162053

(51) Int. Cl.
*B60W 10/24* (2006.01)
*B60R 16/04* (2006.01)

(52) U.S. Cl. ..................................... 180/68.5; 180/65.29

(58) Field of Classification Search ................. 180/68.5, 180/65.21, 65.22, 65.275, 65.29; 903/907, 903/943; 320/107, 109, 113, 115, 119, 122, 320/134, 136
See application file for complete search history.

(56) References Cited

U.S. PATENT DOCUMENTS

| | | | | | |
|---|---|---|---|---|---|
| 3,898,547 | A | * | 8/1975 | Poole | 320/109 |
| 4,090,577 | A | * | 5/1978 | Moore | 180/243 |
| 4,282,475 | A | * | 8/1981 | Milton | 320/138 |
| 4,413,219 | A | * | 11/1983 | Ducharme et al. | 320/109 |
| 4,450,400 | A | * | 5/1984 | Gwyn | 320/109 |
| 5,202,617 | A | * | 4/1993 | Nor | 320/130 |
| 5,301,765 | A | * | 4/1994 | Swanson | 180/68.5 |
| 5,349,535 | A | * | 9/1994 | Gupta | 702/63 |
| 5,378,555 | A | * | 1/1995 | Waters et al. | 429/97 |
| 5,501,289 | A | * | 3/1996 | Nishikawa et al. | 180/68.5 |
| 5,555,950 | A | * | 9/1996 | Harada et al. | 180/65.1 |
| 5,596,261 | A | * | 1/1997 | Suyama | 320/152 |
| 5,612,606 | A | * | 3/1997 | Guimarin et al. | 320/109 |
| 5,631,536 | A | * | 5/1997 | Tseng | 320/137 |
| 5,646,507 | A | * | 7/1997 | Timmons et al. | 320/149 |
| 5,710,502 | A | * | 1/1998 | Poumey | 320/108 |
| 5,711,648 | A | * | 1/1998 | Hammerslag | 414/800 |
| 5,850,136 | A | * | 12/1998 | Kaneko | 320/119 |
| 5,948,298 | A | * | 9/1999 | Ijaz | 219/209 |
| 5,951,229 | A | * | 9/1999 | Hammerslag | 414/398 |

(Continued)

FOREIGN PATENT DOCUMENTS

JP   A-7-231510   8/1995

(Continued)

OTHER PUBLICATIONS

Japanese Office Action dated May 11, 2010 issued in Japanese Patent Application No. 2008-162053 (with translation).

*Primary Examiner* — J. Allen Shriver, II
*Assistant Examiner* — Jacob Meyer
(74) *Attorney, Agent, or Firm* — Oliff & Berridge, PLC

(57) ABSTRACT

A vehicle includes: rotatable wheels; a rotary electric machine that generates power for driving the wheels; a battery that supplies electric power to the rotary electric machine and that is fixed to the vehicle; and a detachable battery that supplies electric power to the rotary electric machine, that is detachable from the vehicle and that is arranged at a center in a width direction of the vehicle.

12 Claims, 11 Drawing Sheets

U.S. PATENT DOCUMENTS

| | | | | |
|---|---|---|---|---|
| 5,969,624 A | * | 10/1999 | Sakai et al. | 340/636.1 |
| 5,998,963 A | * | 12/1999 | Aarseth | 320/109 |
| 6,014,597 A | * | 1/2000 | Kochanneck | 701/22 |
| 6,029,762 A | * | 2/2000 | Kepner | 180/65.1 |
| 6,188,574 B1 | * | 2/2001 | Anazawa | 361/695 |
| 6,227,322 B1 | * | 5/2001 | Nishikawa | 180/68.5 |
| 6,260,645 B1 | * | 7/2001 | Pawlowski et al. | 180/65.22 |
| 6,378,637 B1 | * | 4/2002 | Ono et al. | 180/65.31 |
| 6,541,154 B2 | * | 4/2003 | Oogami et al. | 429/159 |
| 6,598,691 B2 | * | 7/2003 | Mita et al. | 180/65.1 |
| 6,662,891 B2 | * | 12/2003 | Misu et al. | 180/68.1 |
| 6,741,065 B1 | * | 5/2004 | Ishii et al. | 320/122 |
| 6,811,197 B1 | * | 11/2004 | Grabowski et al. | 296/37.8 |
| 7,135,839 B2 | * | 11/2006 | Iida et al. | 320/149 |
| 7,193,393 B1 | * | 3/2007 | Payne | 320/119 |
| 7,424,926 B2 | * | 9/2008 | Tsuchiya | 180/68.5 |
| 7,545,121 B2 | * | 6/2009 | Bolduc | 320/163 |
| 7,602,143 B2 | * | 10/2009 | Capizzo | 320/109 |
| 7,631,712 B2 | * | 12/2009 | Watanabe | 180/68.5 |
| 7,654,351 B2 | * | 2/2010 | Koike et al. | 180/68.5 |
| 7,683,570 B2 | * | 3/2010 | Krauer et al. | 320/104 |
| 7,688,025 B2 | * | 3/2010 | Komaki et al. | 320/106 |
| 7,786,703 B2 | * | 8/2010 | Nakao | 320/149 |
| 7,810,596 B2 | * | 10/2010 | Tsuchiya | 180/68.5 |
| 2001/0030069 A1 | * | 10/2001 | Misu et al. | 180/68.1 |
| 2003/0209375 A1 | * | 11/2003 | Suzuki et al. | 180/65.3 |
| 2004/0232672 A1 | * | 11/2004 | Bandoh et al. | 280/735 |
| 2006/0096797 A1 | * | 5/2006 | Tsuchiya | 180/68.5 |
| 2007/0119641 A1 | * | 5/2007 | Tien | 180/68.5 |
| 2007/0292752 A1 | * | 12/2007 | Tsuchiya | 429/120 |
| 2008/0164081 A1 | * | 7/2008 | Watanabe et al. | 180/65.2 |
| 2008/0173488 A1 | * | 7/2008 | Takasaki | 180/68.5 |
| 2008/0173489 A1 | * | 7/2008 | Takasaki | 180/68.5 |
| 2008/0190679 A1 | * | 8/2008 | Sato et al. | 180/68.5 |
| 2008/0245587 A1 | * | 10/2008 | Sastry et al. | 180/65.2 |
| 2009/0015202 A1 | * | 1/2009 | Miura | 320/132 |
| 2009/0183935 A1 | * | 7/2009 | Tsuchiya | 180/68.1 |
| 2010/0038156 A1 | * | 2/2010 | Fujitake et al. | 180/65.22 |
| 2010/0141206 A1 | * | 6/2010 | Agassi et al. | 320/109 |
| 2010/0145717 A1 | * | 6/2010 | Hoeltzel | 705/1.1 |

FOREIGN PATENT DOCUMENTS

| | | |
|---|---|---|
| JP | A-2001-57711 | 2/2001 |
| JP | A-2004-262357 | 9/2004 |
| JP | A-2004-311139 | 11/2004 |
| JP | A-2004-345447 | 12/2004 |
| JP | A-2005-1655 | 1/2005 |
| JP | B2-3887145 | 2/2007 |
| JP | A-2007-91034 | 4/2007 |
| JP | B2-3925048 | 6/2007 |
| JP | A-2008-117708 | 5/2008 |

* cited by examiner

VEHICLE

INCORPORATION BY REFERENCE

The disclosure of Japanese Patent Application No. 2008-162053 filed on Jun. 20, 2008 including the specification, drawings and abstract is incorporated herein by reference in its entirety.

BACKGROUND OF THE INVENTION

1. Field of the Invention

The invention relates to a vehicle and, more particularly, to a vehicle equipped with an electrical storage device and a drive rotary electric machine.

2. Description of the Related Art

Various vehicles-equipped with an electrical storage device and a drive rotary electric machine have been suggested. For example, Japanese Patent Application Publication No. 2004-262357 (JP-A-2004-262357) describes an electric vehicle that is equipped with a changeable portion, battery modules, and a fixed battery. The changeable portion is provided at the rearmost space of the electric vehicle. The battery modules are accommodated in the changeable portion. The fixed battery is fixed to a floor, or the like. Then, the battery modules accommodated in the changeable portion are arranged at intervals in the width direction of the vehicle, and may be detached or added depending on a travel distance that differs among users.

Japanese Patent Application Publication No. 2005-1655 (JP-A-2005-1655) describes a high-voltage electrical component casing arrangement structure that includes a high-voltage electrical component casing and a battery. The high-voltage electrical component casing is arranged on the floor of a vehicle body and is arranged between a driver seat and a front passenger seat. The battery is accommodated in the high-voltage electrical component casing.

Japanese Patent Application Publication No. 2004-311139 (JP-A-2004-311139) describes a battery pack that includes a battery portion and an accessory portion. The accessory portion includes a cooling fan and a battery electronic control unit (ECU). The battery pack is mounted on a floor panel under a rear seat so that the center of the battery portion coincides with the center of a vehicle in the width direction.

Japanese Patent Application Publication No. 2001-57711 describes an electric vehicle equipped with a detachable cassette battery. Then, fully charged batteries are stored at an energy supply station, and, when the electric vehicle stops by at the energy supply station, all the batteries mounted on the electric vehicle are detached. After that, the detached batteries are replaced with the fully charged batteries and stored at the station.

However, in the electric vehicle described in JP-A-2004-262357, the plurality of battery modules are arranged in the width direction of the vehicle. Therefore, there is a problem that, for example, if a portion of the battery modules at an end is detached, the weight balance of the vehicle is lost.

In the high-voltage electrical component casing arrangement structure described in JP-A-2005-1655, the battery is not detachable and, therefore, the capacity of the battery is not adjustable in response to a user's request. Similarly, the battery pack described in JP-A-2004-311139 is also not detachable and, therefore, the capacity of the battery is not changeable in response to a user's request.

In the electric vehicle described in JP-A-2001-57711, the detachable cassette battery is not directed to changing the capacity of the battery in response to a user's request, and the capacity of the battery is constant.

SUMMARY OF THE INVENTION

The invention provides a vehicle of which the capacity of a battery is changeable in response to a user's purpose and, in addition, which is able to ensure the weight balance of the vehicle when the capacity of the battery is changed.

A first aspect of the invention provides a vehicle. The vehicle includes: rotatable wheels; a drive rotary electric machine that generates power for driving the wheels; a first electrical storage device that supplies electric power to the drive rotary electric machine and that is fixed to a center in a width direction of the vehicle of which the center of gravity is located at the center in the width direction, wherein, when the first electrical storage device is detached, the vehicle is placed in a non-drivable state; and a second electrical storage device that supplies electric power to the drive rotary electric machine, wherein the second electrical storage device is detachable from the vehicle and is arranged at the center in the width direction of the vehicle, and wherein, when the first electrical storage device is attached, the vehicle is placed in a drivable state irrespective of whether the second electrical storage device is attached or detached.

The vehicle may further include: a detecting unit that is able to detect whether the first electrical storage device is attached or detached; and a control unit that is able to switch the vehicle between the drivable state and the non-drivable state.

The second electrical storage device may be electrically connected in parallel with the first electrical storage device. The second electrical storage device may be electrically connected in series with the first electrical storage device.

The vehicle may further include: a driving seat; a front passenger seat that is spaced apart from the driver seat in the width direction of the vehicle; and a vehicle body that defines a passenger compartment, which accommodates the driver seat and the front passenger seat and which is able to accommodate a passenger, and a driving portion compartment, which accommodates the drive rotary electric machine. Then, the second electrical storage device may be arranged in the passenger compartment, and is provided between the driver seat and the front passenger seat.

The vehicle may further include a shock absorbing member that is provided between the driver seat and the front passenger seat and that is fixed to the vehicle body, wherein the second electrical storage device may be fixed onto the shock absorbing member.

The vehicle may further include a front seat; a rear seat that is spaced apart from the front seat at a rear of the vehicle; and a vehicle body that defines a passenger compartment, which accommodates the front seat and the rear seat and which is able to accommodate a passenger, and a driving portion compartment, which accommodates the drive rotary electric machine. Then, the second electrical storage device may be arranged in the passenger compartment and that is provided between the front seat and the rear seat.

The vehicle may further include: a floor panel that defines a floor; a front seat fixing member that fixes the front seat to the floor panel; and a rear seat fixing member that fixes the rear seat to the floor panel. Then, the second electrical storage device may be fixed to the front seat fixing member and the rear seat fixing member.

The front seat may include a driver seat and a front passenger seat that is spaced apart from the driver seat in the width direction of the vehicle. Then, the vehicle may further include: a floor panel that defines a floor surface; a shock absorbing member that is provided between the driver seat and the front passenger seat; and a fixing member that fixes the shock absorbing member to the floor panel. Furthermore, the second electrical storage device may be fixed to the fixing member.

With the vehicle according to the first aspect of the invention, the capacity of a battery is changeable in response to a user's request and, in addition, the weight balance of the vehicle may be ensured when the capacity of the battery is changed.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Embodiments of a vehicle will be described with reference to FIG. 1 to FIG. 13. Although the embodiments described below may refer to number, amount, and the like, the scope of the invention is not specifically limited to those number, amount, and the like, unless otherwise specified. In addition, in the following embodiments, individual components are not always necessary to achieve the aspect of the invention unless otherwise specified. Furthermore, if a plurality of the embodiments are present below, of course, the characteristic portions of the embodiments may be combined as needed unless otherwise specified.

First Embodiment

Figure 1:
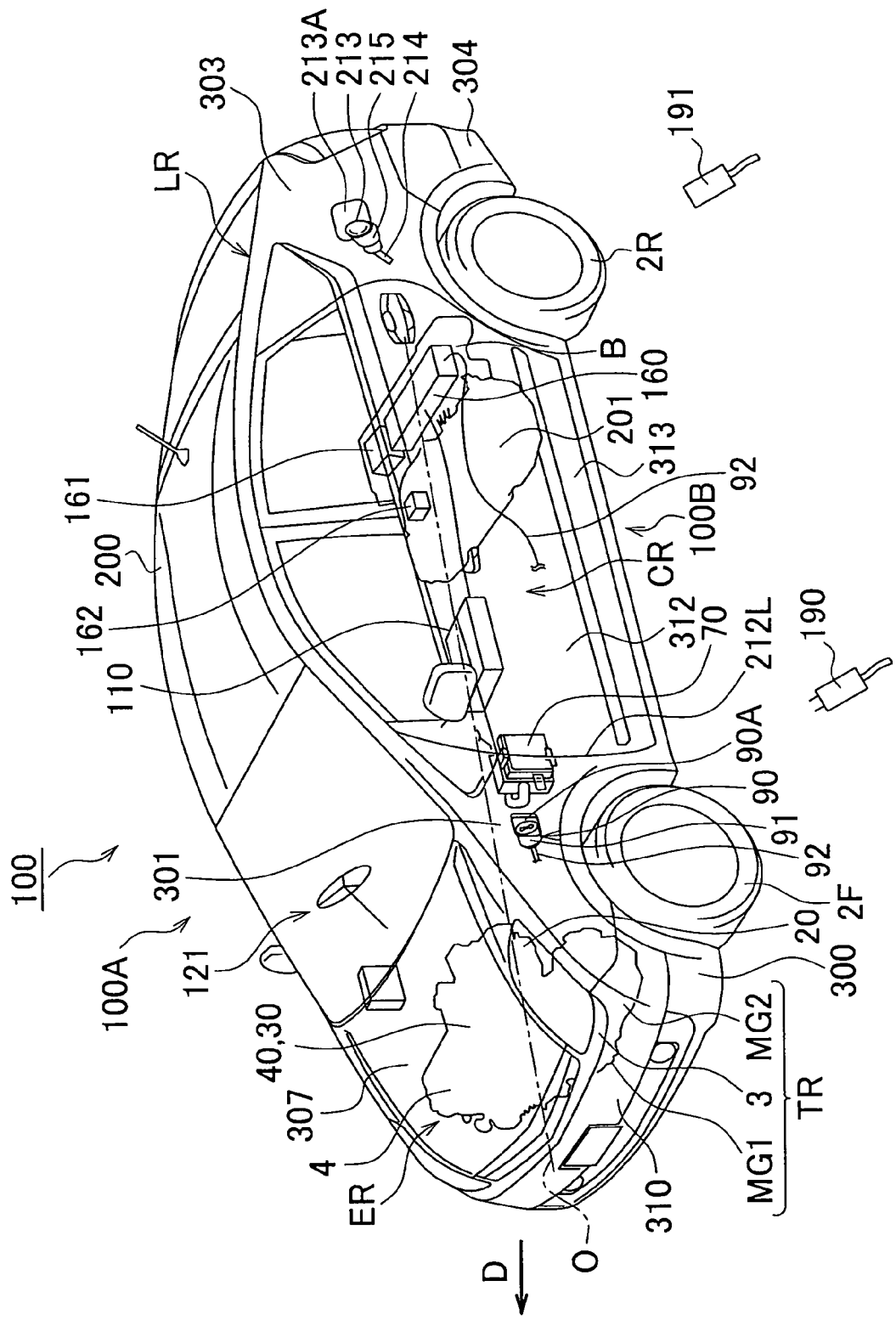
FIG. 1 is a perspective view that shows the schematic configuration of a hybrid vehicle according to a first embodiment of the invention.
Figure 2:
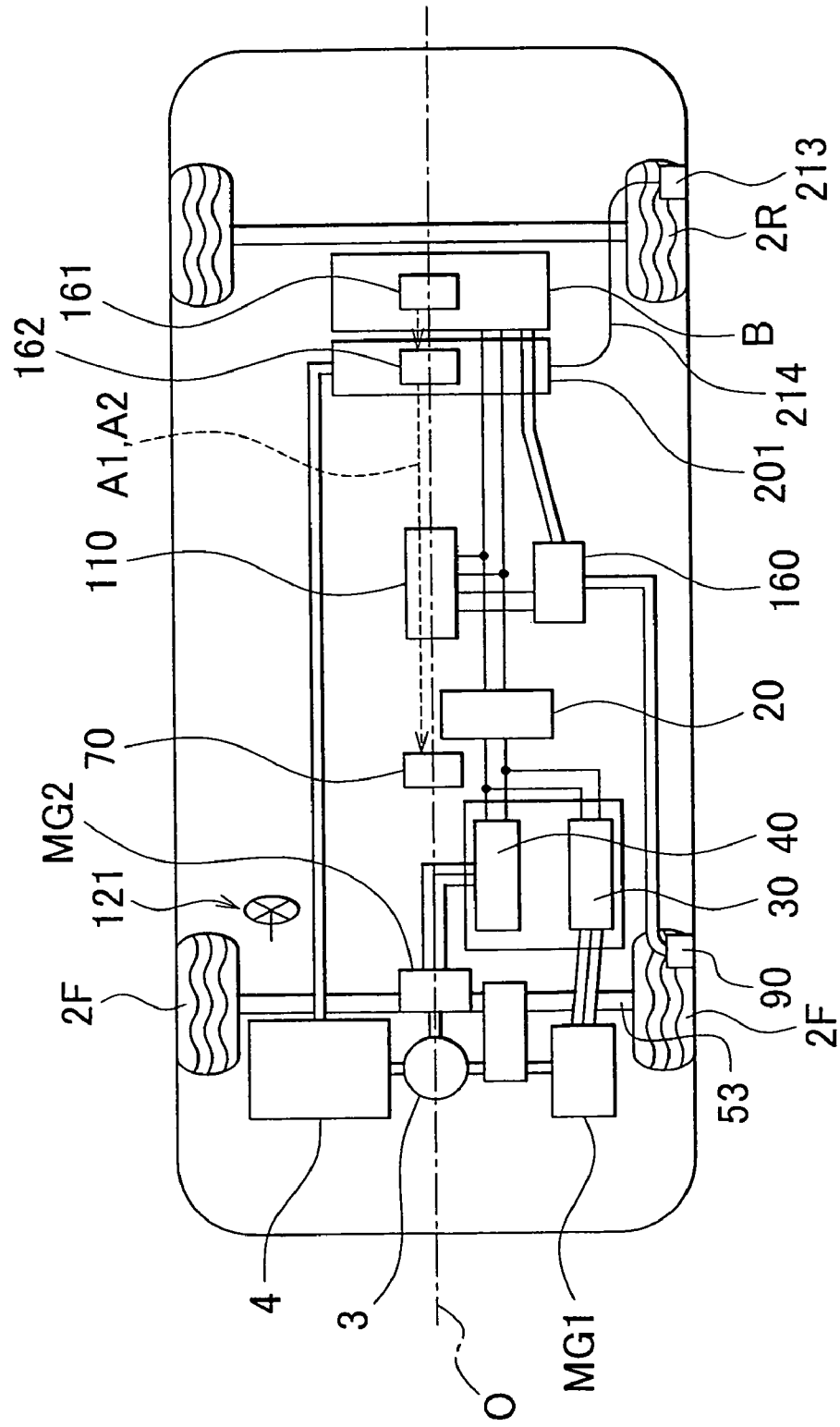
FIG. 2 is a block diagram that shows the schematic configuration of the hybrid vehicle.

A hybrid vehicle 100 according to a first embodiment of the invention will be described with reference to FIG. 1 to FIG. 10. FIG. 1 is a perspective view that shows the schematic configuration of the hybrid vehicle 100 according to the first embodiment of the invention. FIG. 2 is a block diagram that shows the schematic configuration of FIG. 1.

As shown in FIG. 1, the hybrid vehicle 100 includes a vehicle body 200, a pair of front wheels 2F and a pair of rear wheels 2R. The vehicle body 200 is formed of a body and exterior components. The pair of front wheels 2F are provided at the front in a traveling direction D of the hybrid vehicle 100. The pair of rear wheels 2R are provided at the rear in the traveling direction D. The hybrid vehicle 100 further includes a transaxle TR, an engine 4 and an ECU 70. The ECU 70 controls the transaxle TR and the engine 4 for driving.

The vehicle body 200 includes an engine compartment (driving portion compartment) ER, a passenger compartment CR, and a luggage compartment LR. The engine compartment ER is provided at the front in the traveling direction D of the hybrid vehicle 100. The passenger compartment CR is provided adjacent to the engine compartment ER at the rear in the traveling direction D. The luggage compartment LR is provided adjacent to the passenger compartment CR at the rear in the traveling direction D.

A monocoque body is, for example, employed as the body of the vehicle body 200. A plurality of exterior components are attached on the surface of the body to form the vehicle body 200.

For example, as shown in FIG. 1, the exterior components include a front face 310, a front bumper 300, a front fender 301, a front door 312 and a rear door 313. The front face 310 is provided at the front of the vehicle body 200. The front bumper 300 is provided below the front face 310. The front door 312 and the rear door 313 are provided so as to be able to open and close an opening 212L.

In addition, the exterior components further include a hood 307, a rear fender 303 and a rear bumper 304. The hood 307 serves as a top panel of the engine compartment ER. The rear fender 303 is provided on the rear side to the rear door 313 in the traveling direction D. The rear bumper 304 is provided below the rear fender 303.

A driver seat 121, a front passenger seat and a rear seat are provided in the passenger compartment CR. A driver operates the hybrid vehicle 100 at the driver seat 121. The front passenger seat is provided adjacent to the driver seat in the width direction of the hybrid vehicle 100. The rear seat is provided behind the front passenger seat and the driver seat 121. A steering, steering shaft, steering gear, and the like, for operating the front wheels 2F are provided at the driver seat 121. In the example shown in FIG. 1, the driver seat 121 is offset from the center line O of the hybrid vehicle 100 toward the right side (one side) 100A of the hybrid vehicle 100. The center line O extends in the traveling direction D.

Then, as shown in FIG. 1, a fuel tank 201 is provided under the rear seat. The fuel tank 201 contains liquid fuel, such as gasoline. A fuel cell or a battery (electrical storage device) B, such as a large-capacitance capacitor, is arranged behind the rear seat in the traveling direction D. Note that the battery B is arranged at the center in the width direction of the hybrid vehicle 100 and on the center line O of the hybrid vehicle 100, and is mounted in the luggage compartment LR. Note that the battery B is fixed to a floor panel that defines the floor surface of the luggage compartment LR.

Furthermore, detachable batteries 110 are mounted in the passenger compartment CR. Note that each detachable battery 110 has a voltage of about 200 V, and is detachable from the hybrid vehicle 100.

The engine 4 and the transaxle TR are accommodated in the engine compartment ER. The engine 4 serves as an internal combustion engine that generates power for driving the front wheels 2F.

The transaxle TR includes a rotary electric machine (drive rotary electric machine) MG1, a rotary electric machine (generator rotary electric machine) MG2, a step-up converter 20, inverters 30 and 40, and a power split mechanism 3. The rotary electric machine MG1 drives the front wheels 2F. The rotary electric machine MG2 functions as a generator. The step-up converter 20 boosts an electric power from the battery B and the detachable batteries 110 to a high voltage. The inverters 30 and 40 respectively convert direct-current power, supplied from the step-up converter 20, into alternating-current power and then supply the alternating-current power to the rotary electric machines MG1 and MG2. The power split mechanism 3 is formed of a planetary gear, or the like.

The engine 4 is offset from the center line O toward the side 100A of the hybrid vehicle 100. The transaxle TR is offset from the center line O toward a side 100B of the hybrid vehicle 100. In this way, the engine 4 is located closer to the side 100A than to the side 100B, while the transaxle TR is located closer to the side 100B than to the side 100A. Thus, when the engine 4 and the transaxle TR are considered as a whole, the center of gravity is located on the center line O or near the center line O. Hence, the hybrid vehicle 100 is balanced in the width direction.

In addition, the center of gravity of each of the detachable batteries 110, the battery B and the fuel tank 201 is located on the center line O or near the center line O, and is located at the center in the width direction of the hybrid vehicle 100. Thus, in any of the detachable batteries 110, the battery B and the fuel tank 201, the weight balance in the width direction of the hybrid vehicle 100 is ensured. Then, even when the detachable batteries 110 are detached from the hybrid vehicle 100 or mounted on the hybrid vehicle 100, the weight balance in the width direction of the hybrid vehicle 100 may be ensured.

The detachable batteries 110 are located in the passenger compartment CR, and are located at the center in the longitudinal direction of the hybrid vehicle 100. Note that, in the present embodiment, the center in the longitudinal direction of the hybrid vehicle 100 corresponds to a region in which the passenger compartment CR is located. In this way, the detachable batteries 110 are arranged at the center in the longitudinal direction of the hybrid vehicle 100. Thus, even when the detachable batteries 110 are mounted or detached, the weight balance in the longitudinal direction of the hybrid vehicle 100 may be ensured.

Within the region located at the center in the width direction of the hybrid vehicle 100, a space located at the center in the longitudinal direction of the hybrid vehicle 100 is a center region of the hybrid vehicle 100, and is a region ranging from a space located between the driver seat and the front passenger seat to the rear seat.

In this way, because the detachable batteries 110 are arranged in the center region of the hybrid vehicle 100 or in a region near the center region, even when the detachable batteries 110 are mounted or detached, it is possible to suppress a large loss of the weight balance of the hybrid vehicle 100.

Here, a charging and feeding portion (first connecting portion) 90 and a refueling portion (second connecting portion) 213 are provided on the side 100B of the hybrid vehicle 100. The side 100B is located opposite to the side 100A to which the driver seat 121 is located closer than to the side 100B.

Then, the charging and feeding portion 90 and the refueling portion 213 balance in weight with the components of the steering, and the like, provided at the driver seat 121.

In the example shown in FIG. 1, the charging and feeding portion 90 is provided for the body. The charging and feeding portion 90 includes a connecting portion 91, a cover portion 90A, and wiring 92. A connector 190 is connectable to the connecting portion 91. The cover portion 90A is pivotally provided for the front fender 301. The wiring 92 is connected to the connecting portion 91. Here, the front fender 301 has an opening. The connecting portion 91 may be exposed to the outside through the opening. The opening may be opened or closed by the cover portion 90A. The connector 190 includes a charging connector, a feeding connector and a charging and feeding connector.

Then, the charging connector is a connector for charging the battery B and the detachable batteries 110 with electric power supplied from a commercial power supply (for example, single-phase alternating-current 100 V in Japan). The charging connector may be, for example, an outlet connected to a typical domestic power supply.

Note that a method of exchanging electric power between the connector 190 and the charging and feeding portion 90 may be of a contact type (conductive) in which part of the connector 190 directly contacts at least part of the charging and feeding portion 90 or may be of a noncontact type (inductive).

The wiring 92 is connected to a converter 160. The converter 160 is connected to the detachable batteries 110 and the battery B. In the hybrid vehicle 100 according to the present embodiment, the converter 160 is used to, for example, charge the battery B and the detachable batteries 110. Note that the converter 160 has the function of an inverter for converting alternating current into direct current and the function of a converter for boosting a voltage. Note that it is applicable that the wiring 92 is connected to a neutral point of the rotary electric machines MG1 and MG2 to allow electric power to be supplied from the connector 190 via the rotary electric machines MG1 and MG2, the inverters 30 and 40 and the step-up converter 20 to the battery B and the detachable batteries 110. Then, when the detachable batteries 110 and the battery B are charged, alternating current supplied to the charging and feeding portion 90 is converted by the converter 160 into direct current and then supplied to the detachable batteries 110 and the battery B. Furthermore, when electric power stored in the detachable batteries 110 and the battery B are supplied to an external load, or the like, direct current is supplied from the detachable batteries 110 and the battery B to the converter 160. The converter 160 converts the supplied direct current into alternating current and supplies the alternating current to the charging and feeding portion 90.

In addition, in the example shown in FIG. 1, the refueling portion 213 is provided for the body. The refueling portion 213 includes a nozzle receiving portion 215, a fuel filler tube 214, and a cover portion 213A. The nozzle receiving portion 215 has an opening. The fuel filler tube 214 is connected to the nozzle receiving portion 215 and the fuel tank 201. The cover portion 213A is provided for an exterior component. The opening of the nozzle receiving portion 215 may be opened or closed by the cover portion 213A. Note that the nozzle receiving portion 215 may be exposed to the outside through the opening formed in the exterior component.

Then, the nozzle receiving portion 215 is able to receive a fuel service nozzle of a refueling connector 191 provided outside the hybrid vehicle 100. Then, refueled fuel, such as gasoline, is supplied to the fuel tank 201 via the fuel filler tube 214.

The refueling portion 213 and the charging and feeding portion 90 are provided on the same side 100B of the hybrid vehicle 100. Therefore, a driver easily memorizes the positions of the charging and feeding portion 90 and refueling portion 213. This can reduce an erroneous entry or stop direction of the hybrid vehicle 100 when the driver drives the hybrid vehicle 100 to enter an electric recharging and refueling station, or the like.

As shown in FIG. 2, the detachable batteries 110 are electrically connected in parallel with the battery B. Thus, by mounting the detachable batteries 110 on the hybrid vehicle 100, the capacitance of the hybrid vehicle 100 may be increased.

In this way, it is possible to adjust the capacitance by allowing the detachable batteries 110 to be detachable from the hybrid vehicle 100. Then, for example, when a user wants to drive to and from work for a long distance in traveling on electric power, an additional detachable battery 110 is mounted to make it possible to satisfy the user's request. Note that the plurality of detachable batteries 110 may be detachable from the hybrid vehicle 100.

Then, as shown in FIG. 2, the battery B is equipped with a transmitter 161, and the vehicle body includes a receiver 162 that receives a signal from the transmitter 161. Then, while the receiver 162 is receiving the signal from the transmitter 161, the receiver 162 transmits a signal A1, which indicates that the receiver 162 is receiving a signal from the transmitter 161, to the ECU 70. On the other hand, when the receiver 162 cannot receive a signal from the transmitter 161 for a predetermined period of time, the receiver 162 transmits a signal A2, which indicates that the receiver 162 cannot receive a signal from the transmitter 161, to the ECU 70.

As the ECU 70 receives the signal A2 from the receiver 162, the ECU 70 prohibits the hybrid vehicle 100 from driving to place the hybrid vehicle 100 in a non-drivable state. Specifically, the ECU 70 executes control for prohibiting the rotary electric machines MG1 and MG2 from driving and prohibiting the engine 4 from starting up or driving. On the other hand, as the ECU 70 receives the signal A1 from the receiver 162, the ECU 70 executes control for allowing the rotary electric machines MG1 and MG2 and the engine 4 to start up and drive. In this way, as the battery B is detached, the hybrid vehicle 100 is placed in a non-drivable state.

On the other hand, even when the detachable batteries 110 are detached in a state where the battery B is mounted on the hybrid vehicle 100, electric power can be supplied from the battery B to the step-up converter 20 and the inverters 30 and 40.

Thus, as long as the battery B is mounted, the ECU 70 places the hybrid vehicle 100 in a drivable state irrespective of whether the detachable batteries 110 are mounted or detached.

Note that a method for placing the hybrid vehicle 100 in a non-drivable state when the battery B is detached is not limited to the above described configuration. For example, it is applicable that a push switch is provided so that the push switch is depressed by the battery B to turn on and is turned off when the battery B is detached. Note that the push switch transmits the signal A1 to the ECU 70 when the push switch is turned on, and transmits the signal A2 to the ECU 70 when the push switch is turned off.

Figure 3:
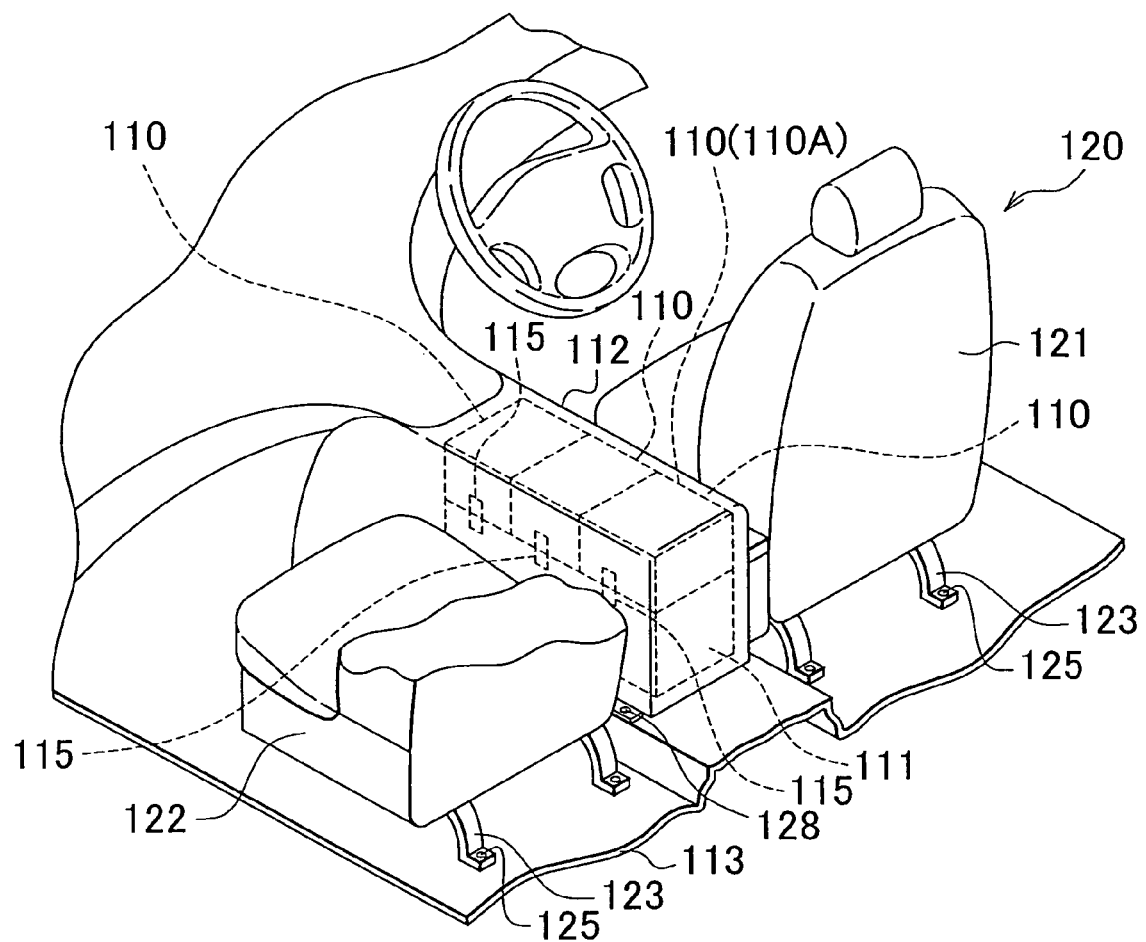
FIG. 3 is a perspective view of the state of arrangement of detachable batteries and components around the detachable batteries.

FIG. 3 is a perspective view of the state of arrangement of the detachable batteries 110 and components around the detachable batteries 110. As shown in FIG. 3, the hybrid vehicle 100 includes a floor panel 113 that defines the floors of the passenger compartment CR and luggage compartment LR. The floor panel 113 is provided on a side member and a cross member, and is formed in a plate-like shape.

Then, a front row seat 120 is provided in the passenger compartment CR. The front row seat 120 includes the driver seat 121 and the front passenger seat 122. The front passenger seat 122 is spaced apart from the driver seat 121 in the width direction of the hybrid vehicle 100.

The driver seat 121 and the front passenger seat 122 each have a plurality of legs 123. Each of the legs 123 is fixed to the floor panel 113 by a fixing member 125, such as a bolt.

A console box 112 is provided between the driver seat 121 and the front passenger seat 122. The console box 112 accommodates a crush box 111 and the detachable batteries 110. The detachable batteries 110 are fixed onto the crush box 111.

The crush box 111 is formed of a metal member and is formed in a substantially rectangular parallelepiped shape. The crush box 111 is formed in a hollow shape. The bottom of the crush box 111 is fixed to the floor panel 113 by a fixing member 128. Note that the fixing member 128 is exposed out from the console box 112 to the passenger compartment CR.

The crush box 111 prevents a collision between the front passenger seat 122 and the driver seat 121 when the hybrid vehicle 100, for example, experiences a side collision. Furthermore, a deformation of the crush box 111 reduces an impact force transmitted between the driver seat 121 and the front passenger seat 122.

The detachable batteries 110 are fixed to the upper surface of the crush box 111 by a plurality of fixing members 115. In this way, the detachable batteries 110 are fixed to the floor panel 113 via the crush box 111.

Thus, although no fixing member for directly fixing the detachable batteries 110 to the floor panel 113 is provided, the detachable batteries 110 may be fixed.

The plurality of detachable batteries 110 are arranged in the longitudinal direction of the vehicle. Thus, even when any one of the detachable batteries 110 is detached to adjust an output from the detachable batteries 110, it is possible to ensure the weight balance of the hybrid vehicle 100 in the width direction.

Each of the detachable batteries 110 has a plurality of battery packs and an accommodating case 110A. Each of the battery packs is formed of a plurality of stacked battery modules. The accommodating case 110A accommodates the plurality of battery packs. Then, the fixing members 115 are provided for the accommodating case 110A. Note that, as described above, the detachable batteries 110 are provided between the driver seat 121 and the front passenger seat 122, so, even when the detachable batteries 110 are mounted or detached, the weight balance of the hybrid vehicle 100 in the longitudinal direction and in the width direction is ensured. Note that in the example shown in FIG. 3, the console box 112 is arranged between the driver seat 121 and the front passenger seat 122; however, the arrangement of the console box 112 is not limited to this configuration. For example, when a center seat is provided between the driver seat 121 and the front passenger seat 122, the console box 112 is mounted under the center seat and on the floor panel.

Figure 4:
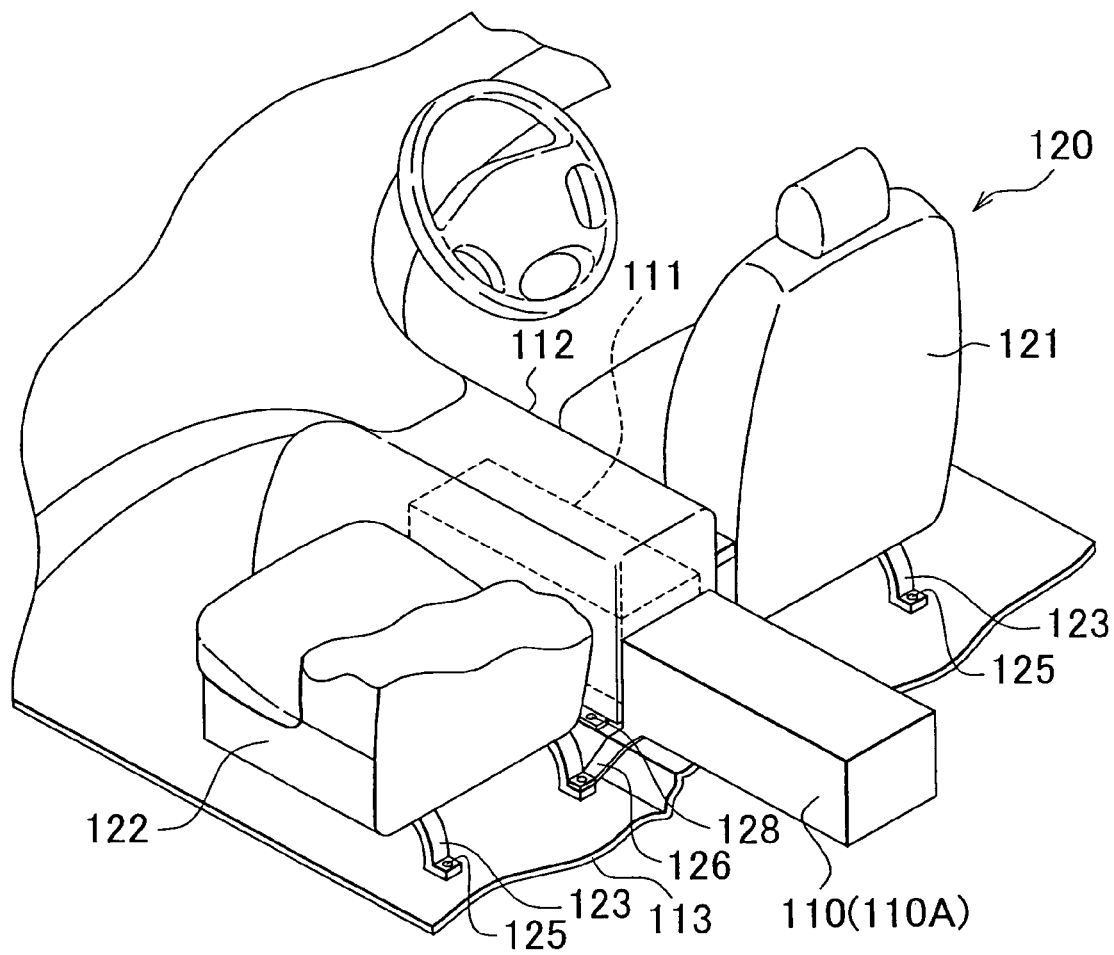
FIG. 4 is a perspective view that shows a first alternative embodiment of a position at which the detachable battery is mounted.

Furthermore, the position at which the detachable batteries 110 are mounted is not limited to this example. For example, FIG. 4 is a perspective view that shows a first alternative embodiment of a position at which the detachable battery 110 is mounted, and FIG. 5 is a perspective view of a rear end side of the detachable battery 110 shown in FIG. 4.

Figure 5:
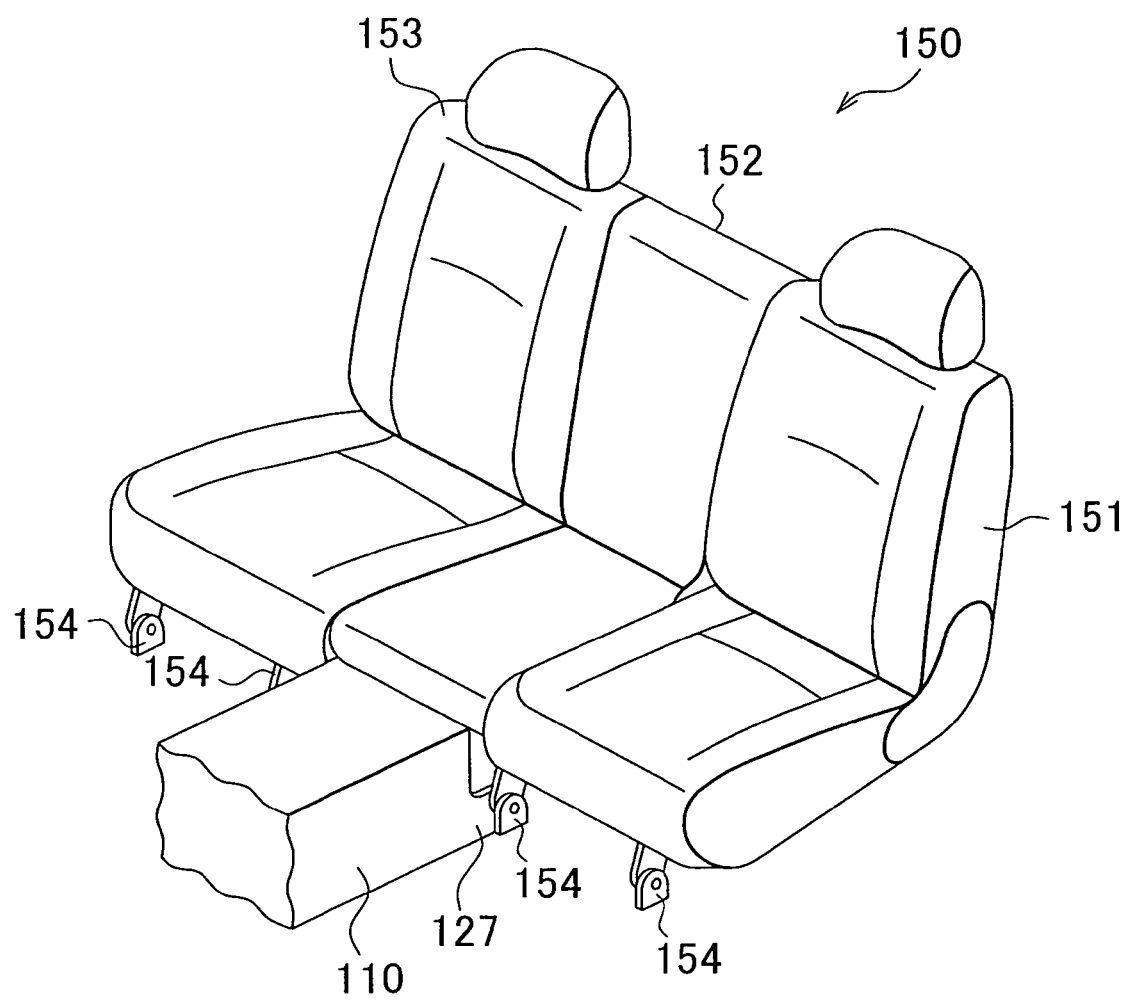
FIG. 5 is a perspective view of a rear end side of the detachable battery shown in FIG. 4.

As shown in FIG. 5, the hybrid vehicle 100 includes a rear seat 150 in the passenger compartment CR. The rear seat 150 is spaced apart from the front row seat 120 at the rear of the hybrid vehicle 100.

The rear seat 150 includes a left rear seat 151, a center rear seat 152 and a right rear seat 153. The rear seat 150 is fixed to the floor panel 113 by a plurality of legs 154. Note that the plurality of legs 154 are provided at intervals in the width direction of the hybrid vehicle 100.

The center rear seat 152 is arranged at the center in the width direction of the hybrid vehicle 100. Then, the detachable battery 110 is arranged on the center line O between the front row seat 120 and the rear seat 150, and the detachable battery 110 is arranged between the console box 112 and the center rear seat 152. In this way, in the example shown in FIG. 4 and FIG. 5 as well, the detachable battery 110 is mounted at the center in the width direction of the hybrid vehicle 100 and at the center in the longitudinal direction of the hybrid vehicle 100. Thus, it is possible to suppress a loss of the weight balance in the width direction and longitudinal direction of the hybrid vehicle 100 even when the detachable battery 110 is detached or mounted.

The detachable battery 110 has legs 126 and a leg 127. One of the legs 126 is fixed to the fixing member 125 of the leg 123 of the front passenger seat 122. The other one of the legs 126 is fixed to the fixing member 125 of the leg 123 of the driver seat 121. The leg 127 is fixed to the leg 154 of the rear seat 150. In addition, the detachable battery 110 further has a leg. The leg is provided at a side opposite the side at which the leg 127 is provided and is fixed to a leg 154 different from the leg 154 to which the leg 127 is fixed.

In this way, by using the legs 154 and the legs 123 as fixing members for fixing the detachable battery 110, it is not necessary to provide a member for fixing the detachable battery 110, and it is possible to reduce the number of components.

Note that in the example shown in FIG. 4 and FIG. 5 as well, the detachable battery 110 is electrically connected in parallel with the battery B.

Figure 6:
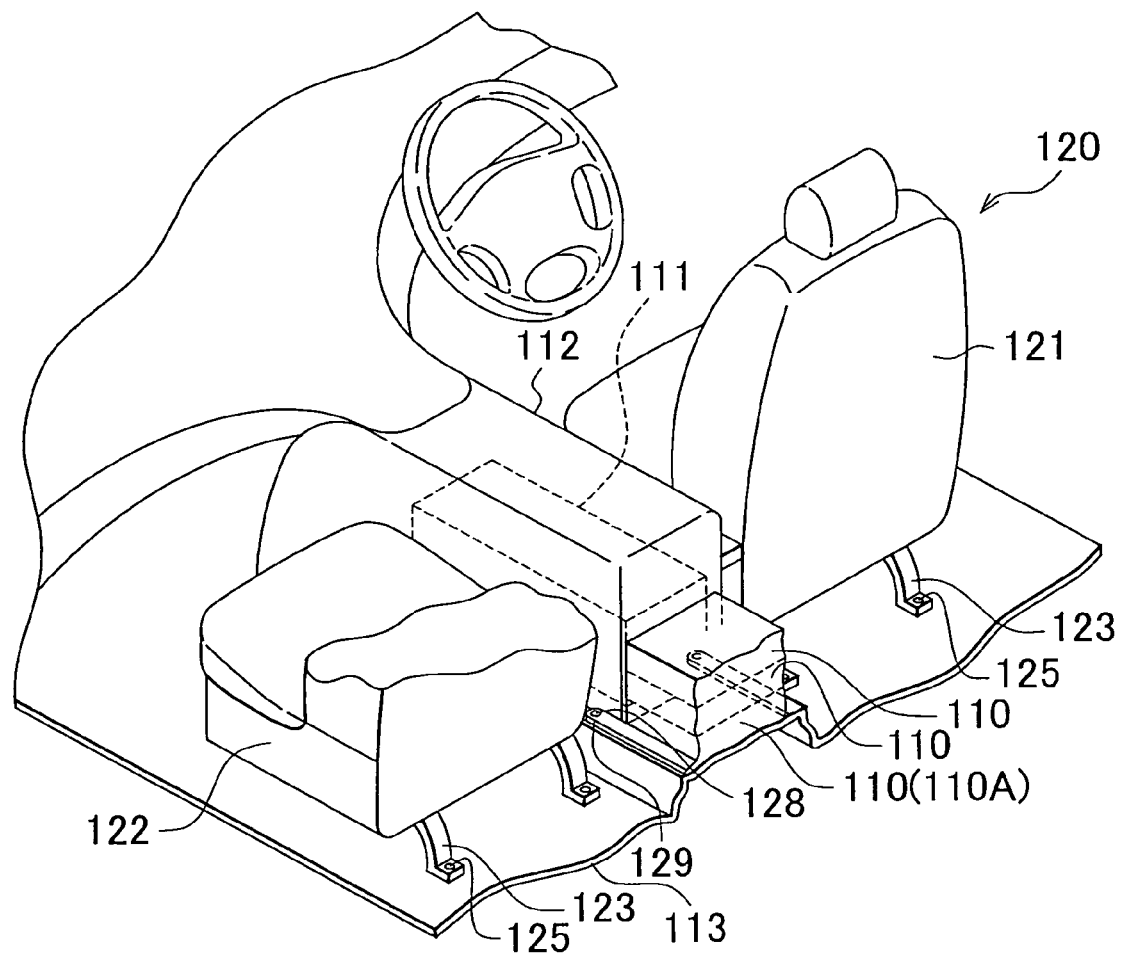
FIG. 6 is a perspective view that shows a second alternative embodiment of the detachable batteries.

FIG. 6 is a perspective view that shows a second alternative embodiment of the detachable batteries 110. As shown in FIG. 6, the detachable batteries 110 may be fixed to the fixing member 128 of the crush box 111. In this case, the detachable batteries 110 have a leg 129 that is fixed to the fixing member 128.

Note that in the example shown in FIG. 6, the plurality of detachable batteries 110 are stacked in a height direction of the vehicle. Then, the detachable batteries 110 are located between the front row seat 120 and the rear seat 150, and is located at the center in the width direction of the hybrid vehicle 100 and at the center in the longitudinal direction of the hybrid vehicle 100. In this way, the detachable batteries 110 are located at the center of the hybrid vehicle 100. Thus, it is possible to suppress a loss of the weight balance in the width direction and longitudinal direction of the hybrid vehicle 100 even when a portion of the plurality of detachable batteries 110 are detached or newly added.

Figure 7:
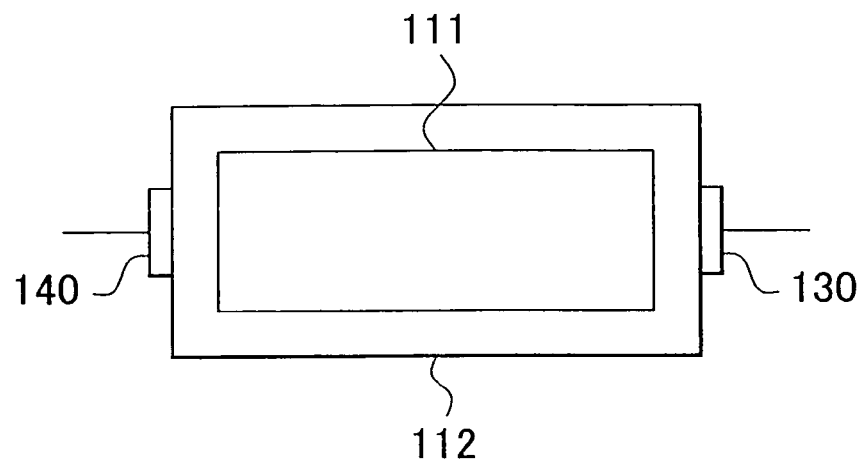
FIG. 7 is a plan view of a console box shown in FIG. 3.

FIG. 7 is a plan view of the console box 112 shown in FIG. 3. Note that the inside of the console box 112 is formed in a hollow shape, and a cover member is detachably provided at the top of the console box 112. Then, FIG. 7 shows a plan view in a state where the cover member is detached. As shown in FIG. 7, female connectors 130 and 140 are provided for the console box 112. Note that the end surface of the female connector 130 and the end surface of the female connector 140 are provided on the inner surfaces, aligned in the longitudinal direction of the hybrid vehicle 100, of the console box 112.

Figure 8:
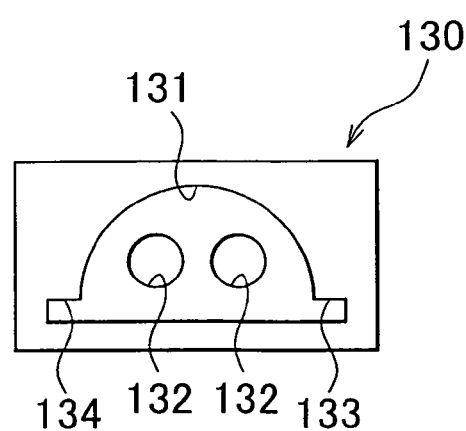
FIG. 8 is a front view of a female connector as viewed from the inside of the console box.

FIG. 8 is a front view of the female connector 130 as viewed from the inside of the console box 112. As shown in FIG. 8, the end surface of the female connector 130 has a recess 131 and terminal holes 132. The recess 131 is formed so as to recede from the inner surface of the console box 112. The terminal holes 132 are formed at the bottom of the recess 131, and terminals are inserted in the terminal holes 132.

The recess 131 is formed in a substantially semi-circular shape. The recess 131 has cutout portions 133 and 134 that protrude radially outward.

Figure 9:
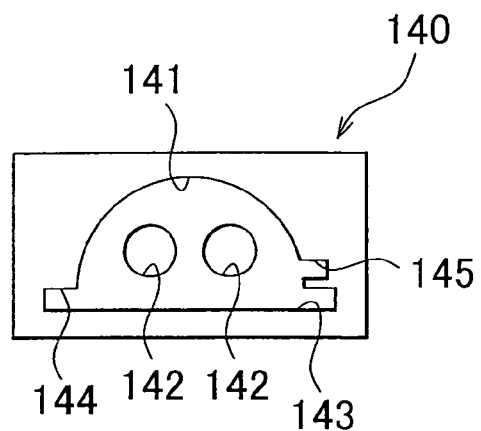
FIG. 9 is a front view of a female connector as viewed from the inside of the console box.

FIG. 9 is a front view of the female connector 140 as viewed from the inside of the console box 112. As shown in FIG. 9, the end surface of the female connector 140 has a recess 141 and terminal holes 142. The recess 141 is formed so as to recede from the inner surface of the console box 112. The terminal holes 142 are formed at the bottom of the recess 141, and terminals are inserted in the terminal holes 142.

Then, the recess 141 is formed in a substantially semi-circular shape. The recess 141 has cutout portions 143 and 144 and a cutout portion 145. The cutout portions 143 and 144 protrude radially outward. The cutout portion 145 is located above the cutout portion 143.

In this way, the insertion hole of the female connector 140 has a slightly different shape from the insertion hole of the female connector 130.

Figure 10:
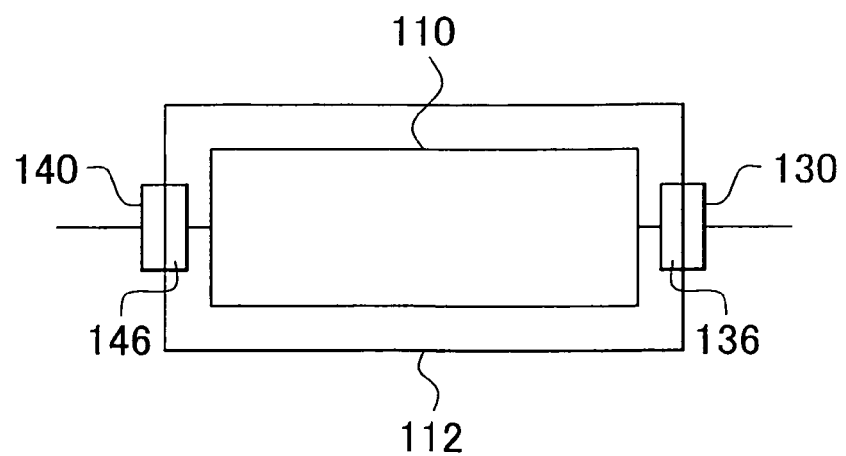
FIG. 10 is a plan view of the console box when the detachable battery is mounted.

FIG. 10 is a plan view of the console box 112 when the detachable battery 110 is mounted. As shown in FIG. 10, a male connector 136 and a male connector 146 are connected to the detachable battery 110. The male connector 136 is adapted to the female connector 130. The male connector 146 is adapted to the female connector 140.

The male connector 136 is formed so that the outer peripheral portion is adapted to the inner peripheral portion of the recess 131. The male connector 136 has an insertion portion and terminal portions. The insertion portion may be inserted into the recess 131. The terminal portions are formed on the end surface of the insertion portion. The terminal portions are inserted into the terminal holes 132 and connected to the terminals inside the terminal holes 132.

The male connector 146 is formed so that the outer peripheral portion is adapted to the inner peripheral portion of the recess 141. The male connector 146 has an insertion portion and terminal portions. The insertion portion may be inserted into the recess 141. The terminal portions are formed on the end surface of the insertion portion. The terminal portions are inserted into the terminal holes 142 and connected to the terminals inside the terminal holes 142.

In this way, the shape of the recess 131 of the female connector 130 is different from the shape of the recess 140 of the female connector 140, and the shape of the insertion portion of the male connector 136 is different from the shape of the insertion portion of the male connector 146. This prevents the male connector 146 from being fitted to the female connector 130, and prevents the male connector 136 from being fitted to the female connector 140.

Thus, when the detachable battery 110 is mounted in the console box 112, erroneous connection of the connectors is prevented.

Note that the console box 112 has a cover portion that closes the opening through which the detachable battery 110 is inserted, and, after the detachable battery 110 is attached, the opening is closed by the cover portion.

Second Embodiment

A hybrid vehicle 100 according to a second embodiment of the invention will be described with reference to FIG. 11 to FIG. 13.

Figure 11:
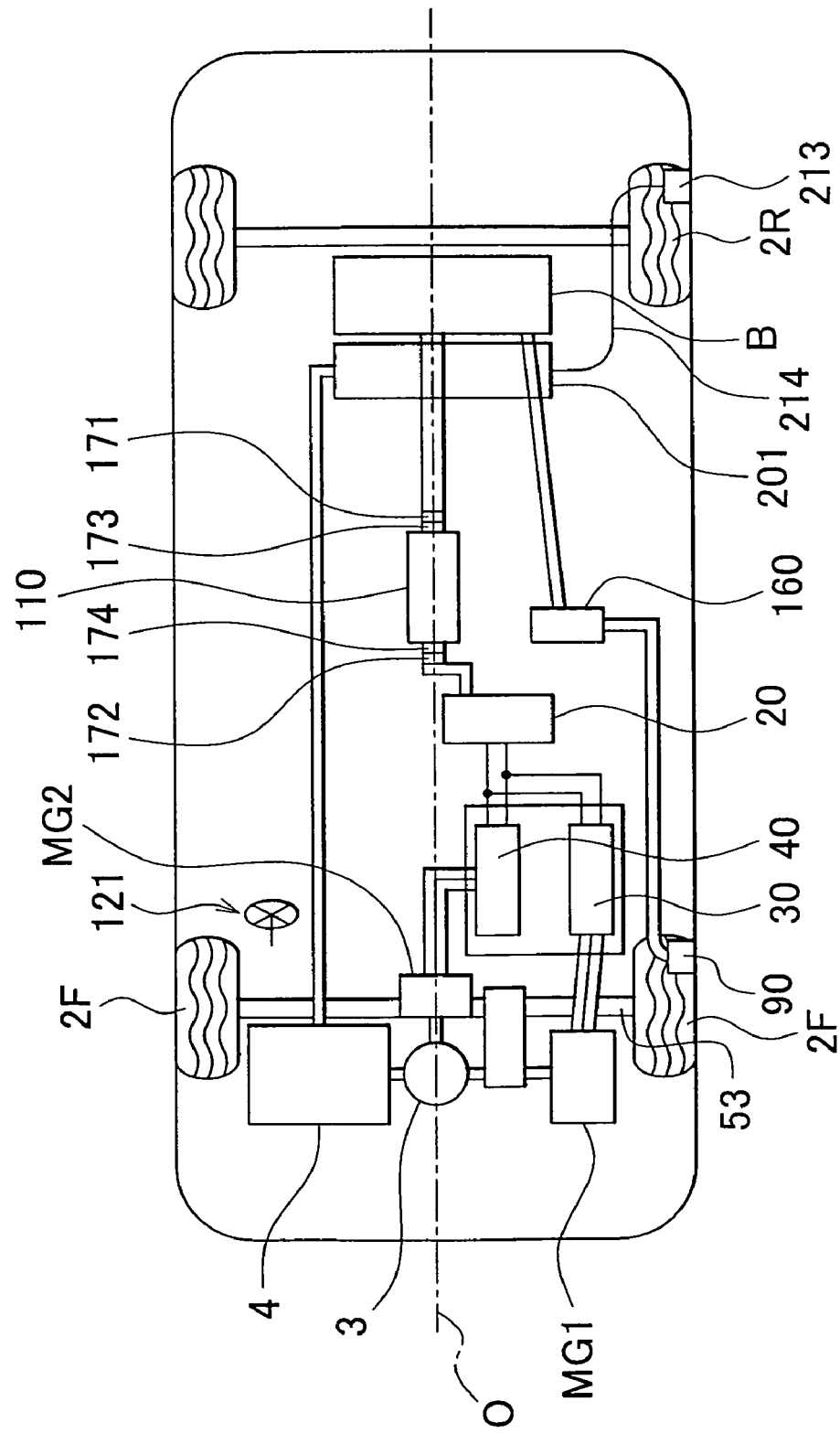
FIG. 11 is a block diagram of a hybrid vehicle according to a second embodiment of the invention.
Figure 12:
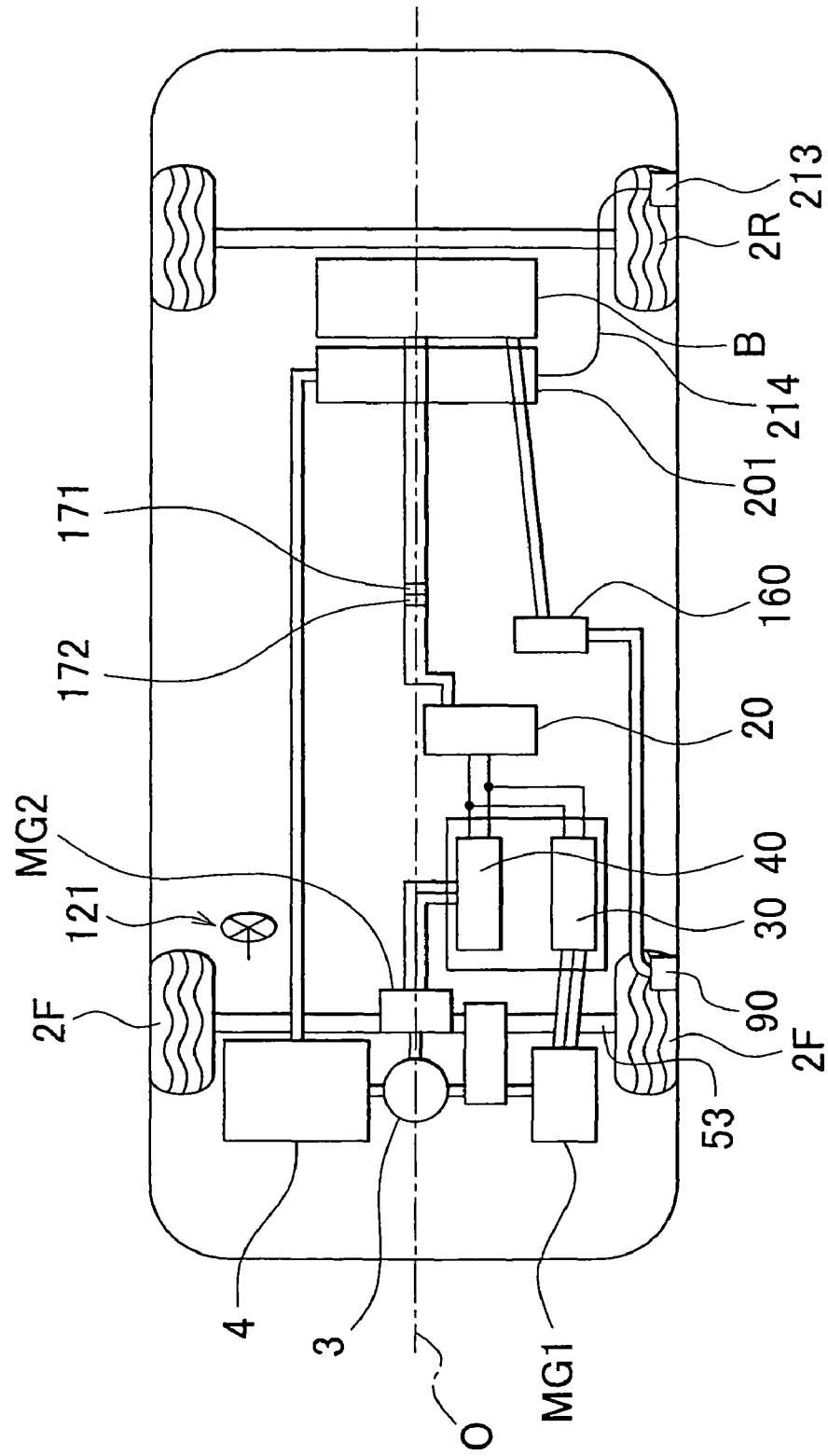
FIG. 12 is a block diagram of the hybrid vehicle when the detachable battery is detached in FIG. 11.
Figure 13:
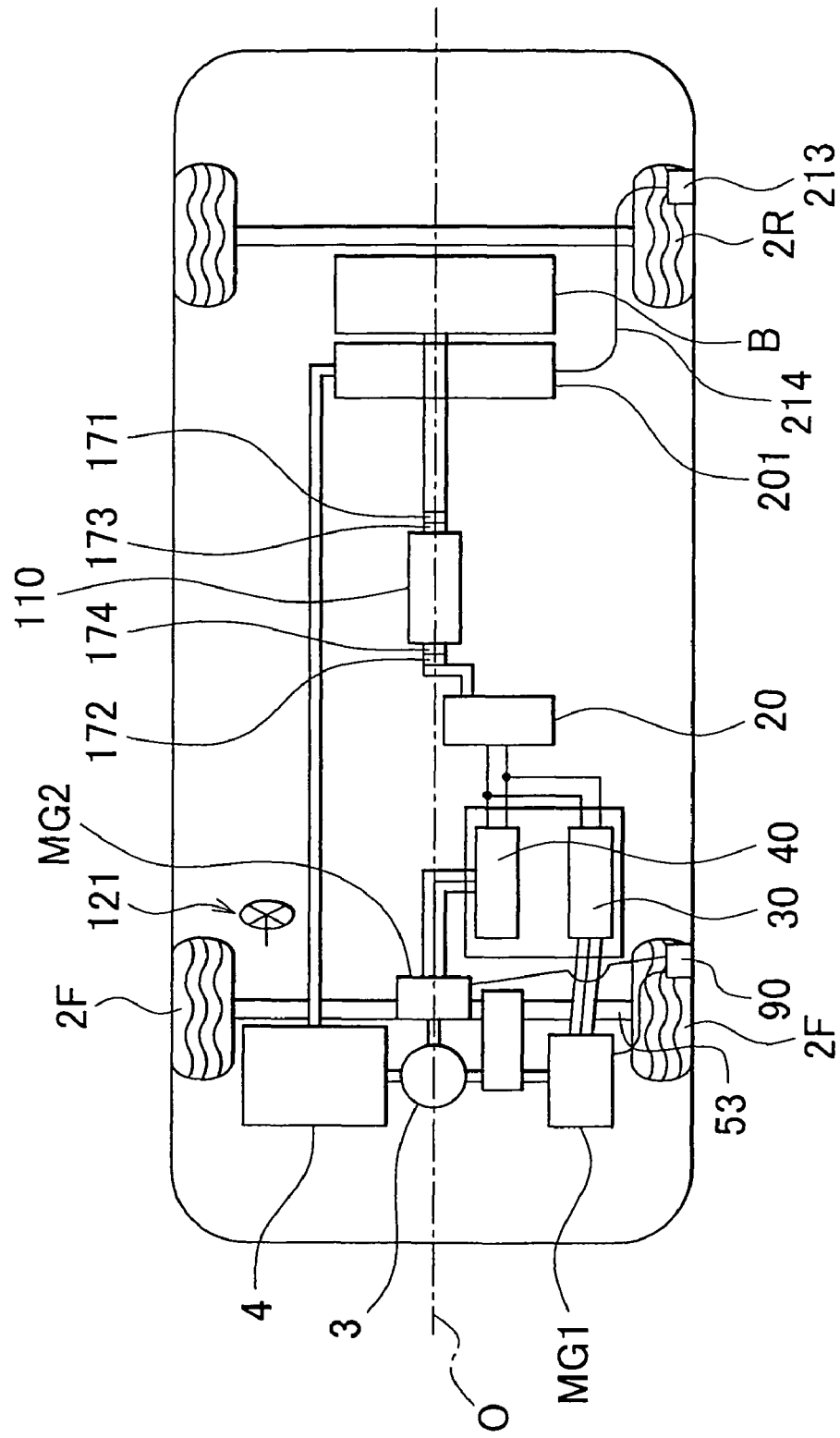
FIG. 13 is a block diagram that shows an alternative embodiment of the hybrid vehicle.

Note that in the configuration shown in FIG. 11 to FIG. 13, like reference numerals denote like or equivalent components to those shown in FIG. 1 to FIG. 10, and the description thereof may be omitted where appropriate.

FIG. 11 is a block diagram of the hybrid vehicle 100 according to the second embodiment of the invention. As shown in FIG. 11, the detachable battery 110 is electrically connected in series with the battery B.

Here, the detachable battery 110 is equipped with a connector 173 and a connector 174. A connector 171 connected to the battery B is fitted to the connector 173. A connector 172 connected to the step-up converter 20 is fitted to the connector 174.

In this way, when the detachable battery 110 connected in series with the battery B is made detachable, it is possible to increase a voltage supplied to the step-up converter 20.

By increasing the voltage supplied to the step-up converter 20, the number of switchings required for boosting a voltage in the step-up converter 20 may be reduced. Thus, it is possible to reduce a switching loss.

By so doing, it is possible to increase an electric power travel distance, and it is also possible to respond to a user's request for a long-distance travel on electric power.

FIG. 12 is a block diagram of the hybrid vehicle when the detachable battery 110 is detached in FIG. 11. As shown in FIG. 12, when the detachable battery 110 is detached, the connector 172 is connected to the connector 171.

Note that in the example shown in FIG. 11 and FIG. 12, the converter 160 is used, for example, for charging and for feeding an external load; however, the configuration is not limited to this.

As shown in FIG. 13, the neutral point of the rotary electric machine MG1 and the rotary electric machine MG2 may be used for charging and for feeding an external load.

Furthermore, in the first embodiment and the second embodiment, the aspect of the invention is applied to the hybrid vehicle; however, application of the aspect of the invention is not limited to the hybrid vehicle. The aspect of the invention may also be applied to an electric vehicle.

The embodiments of the invention are described above; however, the above described embodiments are illustrative and not restrictive in all respects. The scope of the invention is defined by the appended claims. The scope of the invention is intended to encompass all modifications within the scope of the appended claims and equivalents thereof.

The aspect of the invention may be applied to a hybrid vehicle or an electric vehicle that is equipped with a drive rotary electric machine and an electrical storage device, and is suitable for a vehicle that can change the capacity of a battery.

What is claimed is:

1. A vehicle, wherein a center of gravity is located at a center in a width direction of the vehicle comprising:
   rotatable wheels;
   a drive rotary electric machine that generates power for driving the wheels;
   a first electrical storage device that supplies electric power to the drive rotary electric machine and that is fixed to a center in the width direction of the vehicle; and
   a second electrical storage device that supplies electric power to the drive rotary electric machine, wherein the second electrical storage device is detachable from the vehicle and is arranged at the center in the width direction of the vehicle,
   wherein
   when the first electrical storage device is detached, the vehicle is placed in a non-drivable state;
   when the first electrical storage device is attached and the second electrical storage device is detached, the vehicle is placed in a drivable state; and
   when the first electrical storage device is attached and the second electrical storage device is attached, the vehicle is placed in the drivable state.

2. The vehicle according to claim 1, further comprising:
   a detecting unit that is able to detect whether the first electrical storage device is attached or detached; and
   a control unit that is able to switch the vehicle between the drivable state and the non-drivable state.

3. The vehicle according to claim 1, wherein the second electrical storage device is electrically connected in parallel with the first electrical storage device.

4. The vehicle according to claim 1, wherein the second electrical storage device is electrically connected in series with the first electrical storage device.

5. The vehicle according to claim 1, further comprising:
   a driver seat;
   a front passenger seat that is spaced apart from the driver seat in the width direction of the vehicle; and
   a vehicle body that defines a passenger compartment, which accommodates the driver seat and the front passenger seat and which is able to accommodate a passenger, and a driving portion compartment, which accommodates the drive rotary electric machine, wherein
   the second electrical storage device is arranged in the passenger compartment, and is provided between the driver seat and the front passenger seat.

6. The vehicle according to claim 5, further comprising:
   a shock absorbing member that is provided between the driver seat and the front passenger seat and that is fixed to the vehicle body, wherein
   the second electrical storage device is fixed onto the shock absorbing member.

7. The vehicle according to claim 1, further comprising:
   a front seat;
   a rear seat that is spaced apart from the front seat, and is provided at a rear of the vehicle; and
   a vehicle body that defines a passenger compartment, which accommodates the front seat and the rear seat and which is able to accommodate a passenger, and a driving portion compartment, which accommodates the drive rotary electric machine, wherein
   the second electrical storage device is arranged in the passenger compartment and that is provided between the front seat and the rear seat.

8. The vehicle according to claim 7, further comprising:
   a floor panel that defines a floor;
   a front seat fixing member that fixes the front seat to the floor panel; and
   a rear seat fixing member that fixes the rear seat to the floor panel, wherein
   the second electrical storage device is fixed to the front seat fixing member and the rear seat fixing member.

9. The vehicle according to claim 7, wherein
   the front seat includes a driver seat and a front passenger seat that is spaced apart from the driver seat in the width direction of the vehicle; and
   the vehicle further comprising:
   a floor panel that defines a floor surface;
   a shock absorbing member that is provided between the driver seat and the front passenger seat; and
   a fixing member that fixes the shock absorbing member to the floor panel, wherein the second electrical storage device is fixed to the fixing member.

10. The vehicle according to claim 1, wherein the second electrical storage device is arranged at a center in a longitudinal direction of the vehicle.

11. The vehicle according to claim 1, wherein a plurality of the second electrical storage devices are arranged in a longitudinal direction of the vehicle.

12. The vehicle according to claim 1, wherein a plurality of the second electrical storage devices are stacked in a height direction of the vehicle.

\* \* \* \* \*